United States Patent

[11] 3,585,869

| | | | |
|---|---|---|---|
| [72] | Inventor | Pierre Lemor |
| | | Ville D'Avray, France |
| [21] | Appl. No. | 837,078 |
| [22] | Filed | June 27, 1969 |
| [45] | Patented | June 22, 1971 |
| [73] | Assignee | Aktiebolaget Svenska Kullagerfabriken |
| | | Goteborg, Sweden |
| [32] | Priority | June 27, 1967 |
| [33] | | France |
| [31] | | 156,851 |

[54] SCREW AND SOCKET MECHANISM
3 Claims, 1 Drawing Fig.

[52] U.S. Cl. .................................................. 74/89.15,
72/424.8, 74/424.8 C, 74/459
[51] Int. Cl. .......................................................F16h 27/02,
F16h 1/18, F16h 55/04
[50] Field of Search........................................... 74/424.8 C,
424.8 A, 459, 89.14, 89.15

[56]         References Cited
UNITED STATES PATENTS
3,214,991  11/1965  Perrin............................  74/424.8 C Primary Examiner—William F. O'Dea
Assistant Examiner—Wesley S. Ratliff, Jr.
Attorney—Howson and Howson ABSTRACT: A device comprising a screw and a nut-forming tapped socket operatively interconnected by a set of externally screw-threaded planet rollers simultaneously engaging with their threads those of said screw and said socket, characterized in that each planet roller comprises gear teeth meshing simultaneously on the one hand with teeth carried by the socket and on the other hand with the teeth of a ring operatively connected with the screw, said toothed ring being so connected to the screw that it is positively held against rotation with respect to said screw but allow to move axially in relation thereto.

PATENTED JUN22 1971   3,585,869
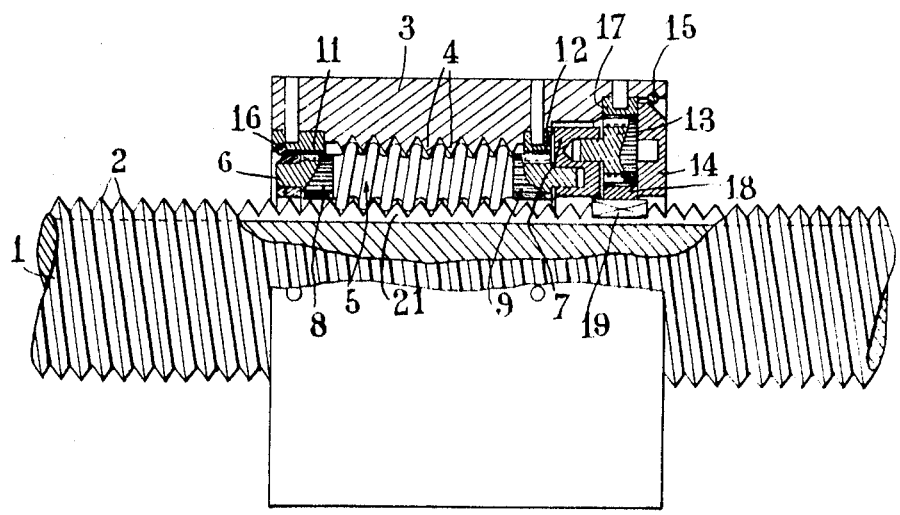
INVENTOR:
PIERRE LEMOR
BY
Howson & Howson
ATTYS.

SCREW AND SOCKET MECHANISM

BACKGROUND OF THE INVENTION

This invention relates in general to mechanical feed systems and has specific reference to a worm and rack mechanism adapted to provide a low-value constant feed per revolution, by converting a movement of rotation into a movement of translation.

Screw and nut devices are already known which transform with a relatively high degree of efficiency a movement of rotation into a movement of translation. As a rule, these devices comprise a screw and a tapped socket or nut which are operatively interconnected by means of screw-threaded planet rollers having a double-curvature thread contour, the threads of these planet rollers engaging those of both screw and socket. More particularly, this invention relates to devices of the above-mentioned type wherein the feed per revolution of the nut differs from the screw pitch and wherein the threads of at least one of the elements (screw or socket) of the device have the same helix angle as that of the roller threads, whereby the planet rollers are prevented from moving axially in relation to this one element.

This device providing a feed per revolution other than the screw pitch is usually referred to as a "constant differential pitch" device when the externally screw-threaded rollers roll without slipping on the screw and on the socket. In this case, the movements of the screw, socket and planet rollers, along the axis of the mechanism are determined positively for all values of their rotational movements.

A condition necessary and sufficient for causing these screw-threaded rollers to roll without slipping on the screw and on the socket is that a train of gears be interposed between the screw-threaded rollers on the one hand and the screw and socket on the other hand, so as to provide a positive connection between the rotation of the rollers and that of the screw and socket.

The manufacture of these planet rollers, screw and socket formed with intermeshing teeth is attended by difficult machining problems and therefore the field of application of these constant differential-pitch systems is rather limited.

SUMMARY OF THE INVENTION

It is the essential object of the present invention to provide a satisfactory solution on this gear machining problem.

To this end, the device according to this invention for transforming a movement of rotation into a movement of translation providing a constant, low-value feed per revolution, which comprises a screw and a nut-forming tapped socket operatively interconnected by a set of externally screw-threaded planet rollers simultaneously engaging with their threads those of said screw and said socket, the threads of the socket having the same helix angle as that of the roller threads, is characterized in that each planet roller comprises gear teeth meshing simultaneously on the one hand with teeth carried by the socket and on the other hand with the teeth of a ring operatively connected with the screw, said toothed ring being so connected to the screw that it is positively held against rotation with respect to said screw but allowed to move axially in relation thereto.

The present invention is advantageous in that it permits of manufacturing devices for transforming a movement of rotation into a movement of translation providing a low-value, constant feed per revolution which is dissimilar and generally lower than the screw pitch, with a high degree of precision and an absolute constancy. The use of the device according to this invention is particularly advantageous in so-called precision machines, such as digit-controlled machines, or in actuators of the nonreversible type, without intermediate reduction gearing and having a relatively high degree of efficiency.

BRIEF DESCRIPTION OF THE DRAWING

A typical form of embodiment of the present invention will now be described by way of nonlimiting example with reference to the single FIGURE of the attached drawing illustrating diagrammatically in fragmentary axial section a motion-transforming device.

DESCRIPTION OF THE PREFERRED EMBODIMENT

The motion-transforming device illustrated in the drawing comprises a screw 1 having a single-thread or multiple-threads 2 surrounded by a coaxial socket 3 formed with internal screw threads 4. Between the screw 1 and socket 3 a plurality of externally screw-threaded planet rollers 5 are disposed at spaced intervals about the screw axis, the threads formed on these rollers 5 engaging both the threads 2 of screw 1 and those 4 of socket 3.

The two longitudinal ends of each planet roller 5 are journaled in a pair of annular flanges 6, 7; each annular flange 6 or 7 constitutes a half-cage or retainer. Besides, these planet rollers 5 are formed at their ends with teeth 8 and 9 meshing with internally toothed annular members 11 and 12 respectively, which are rigid with said socket 3. These toothed annular members 11 and 12 can be machined in the body of socket 3, if desired, or constitute inserts secured thereto, as illustrated in the drawing.

In this specific form of embodiment, the threads of the planet rollers 5 have the same helix angle (or in other words the same inclination) as those 4 of socket 3, whereby the rollers 5 are retained against axial movement in relation to said socket.

On the other hand, the helix angle of the screw threads 2 of screw 1 differs from that of the threads of rollers 5 and socket 3.

From the foregoing it is clear that the screw-threaded planet rollers 5 roll without slipping in the socket 3, since a positive coupling is provided with this socket via the teeth 8 and 9 meshing with the corresponding toothed annular flanges 11 and 12.

To provide a similar positive coupling with the screw 1, the device comprises planet pinions 13 distributed at spaced angular intervals about the axis of screw 1, these planet pinions 13 being trunnioned on the one hand in the annular half-cage 7 and on the other hand in another coaxial annular flange 14. This flange 14 is retained in the longitudinal direction, with the socket 3, by a circlip 15, another circlip 16 retaining the annular half-cage 6 in the proper axial position.

The planet pinions 13 mesh respectively at the exterior with an internally toothed annulus 17 rigid with socket 3 and at the interior with an externally toothed ring 18.

This toothed ring 18 is provided with internal means whereby it is held against rotation in relation to the screw 1 but adapted to slide longitudinally thereon. To this end, the toothed ring 18 carries in its bore one or a plurality of members 19 such as keys, studs, balls - whether in a recirculating-ball system or not - etc..., the member or members 19 sliding in one or a plurality of corresponding longitudinal grooves 21 formed in the screw 1.

A simple circulation permits of determining the relationship existing between the diameters and number of teeth and threads of the various component elements of the device of this invention.

Let be:

| | | |
|---|---|---|
| — Screw elements: | Pitch diameter | $= Dv$ |
| | Number of threads | $= Nv$ |
| — Socket elements: | Pitch diameter | $= Dd$ |
| | Number of threads | $= Nd$ |
| — Screw-threaded roller elements: | Pitch diameter | $= Dr$ |
| | Number of threads | $= Nr$ |
| — Elements of toothed ring rigid with the rotating screw: | Pitch diameter | $= Db$ |
| | Number of teeth | $= Nb$ |

— Elements of toothed annulus
rigid with the socket: Pitch diameter $= Dc$
Number of teeth $= Nc$
— Planet pinion elements: Pitch diameter $= De$
Number of teeth $= Ne$ The condition necessary and sufficient for causing the relative movements of the various elements to produce a rolling movement without slip is:

$$\frac{Dv}{Db} = \frac{Dd}{Dc} = \frac{Dr}{De}$$

The condition necessary and sufficient for causing the movement of translation of the screw-threaded rollers to be zero, for example with respect to the socket, is:

$$\frac{Dd}{Dr} = \frac{Nd}{Nr}$$

from which the following equations can be derived:

$$De = kDr$$

$$Dd = Dr \cdot \frac{Nd}{Nr}$$

$$Dv = Dr \left(\frac{Nd}{Nr} - 2\right)$$

$$Do = kDr \cdot \frac{Nd}{Nr}$$

$$Db = kDr \left(\frac{Nd}{Nr} - 2\right)$$

The value of the factor $k$ used in the above equations is selected as a function of degree of mechanical strength more or less necessary for the sliding toothed ring.

I claim:

1. A mechanism for transforming a rotational movement into a translational movement providing a constant low-value feed per revolution comprising an externally threaded screw member, a nut member forming an internally threaded socket, a pair of annular flanges, a plurality of externally screw-threaded planet rollers disposed between said screw member and said nut member in meshing engagement therewith and rotatably journaled in said annular flanges, the roller threads having the same helix angle as the socket threads, each of said planet rollers having at least one set of teeth in meshing engagement with a first set of complementary internal teeth in said socket, a ring member surrounding said screw, means for positively holding said ring member against rotation in relation to said screw while permitting translational movement of said ring member and a plurality of planet pinions rotatably mounted on one of said annular flanges in meshing engagement with a second set of teeth of said socket member and with external teeth of said ring member.

2. A mechanism as claimed in claim 1, including means defining at least one longitudinally extending groove in said screw member and at least one member connected to said ring member in sliding engagement in said groove.

3. A mechanism as claimed in claim 1 including a third annular flange confronting one of said flanges of said pair and in which said planet pinions are journaled.